United States Patent [19]

Annis et al.

[11] Patent Number: 5,313,511
[45] Date of Patent: May 17, 1994

[54] X-RAY IMAGING PARTICULARLY ADAPTED FOR LOW Z MATERIALS

[75] Inventors: Martin Annis, Cambridge; Paul J. Bjorkholm, Sharon, both of Mass.

[73] Assignee: American Science and Engineering, Inc., Cambridge, Mass.

[21] Appl. No.: 809,246

[22] Filed: Dec. 18, 1991

Related U.S. Application Data

[63] Continuation of Ser. No. 216,586, Jul. 8, 1988, abandoned, which is a continuation of Ser. No. 876,632, Jun. 20, 1986, Pat. No. 4,799,247.

[51] Int. Cl.⁵ .......................................... G01N 23/201
[52] U.S. Cl. ......................................... 378/87; 378/57; 378/90
[58] Field of Search ...................... 378/86–90, 378/99.62, 57

[56] References Cited

U.S. PATENT DOCUMENTS

3,780,291 12/1973 Stein et al. ............................ 378/57
4,123,654 10/1978 Reiss et al. ........................... 378/87

OTHER PUBLICATIONS

Kawatra et al., "The On-Line Measurements of Ash in Coal Slurries", Can. J. Spectrosc., vol. 21, No. 2, Mar.-/Apr. 1976, pp. 58–60.

*Primary Examiner*—David P. Porta
*Attorney, Agent, or Firm*—Pollock, Vande Sande & Priddy

[57] ABSTRACT

An imaging device for increasing the ability to recognize, in x-ray produced images, materials of low atomic number. A flying spot scanner illuminates an object to be imaged in a raster pattern; the flying spot repeatedly sweeps a line in space, and the object to be imaged is moved so that the illuminating beam intersects the object. At least a pair of x-ray detectors are employed, each pair associated with signal processing apparatus and a display. The two detectors employed (and the associated electrons and display) are selected from a set of three which includes a transmitted detector located at the line in space which is repeatedly traversed by the pencil beam, a forward scatter detector which is located further from the x-ray beam than the object to respond to photons scattered by the object being illuminated out of the path of the beam, and a back scatter detector which is located closer to the x-ray source than the object being imaged and also arranged to detect photons scattered out of the beam path by the object. In another embodiment of the invention all three detectors and their associated electronics/displays are employed.

8 Claims, 4 Drawing Sheets

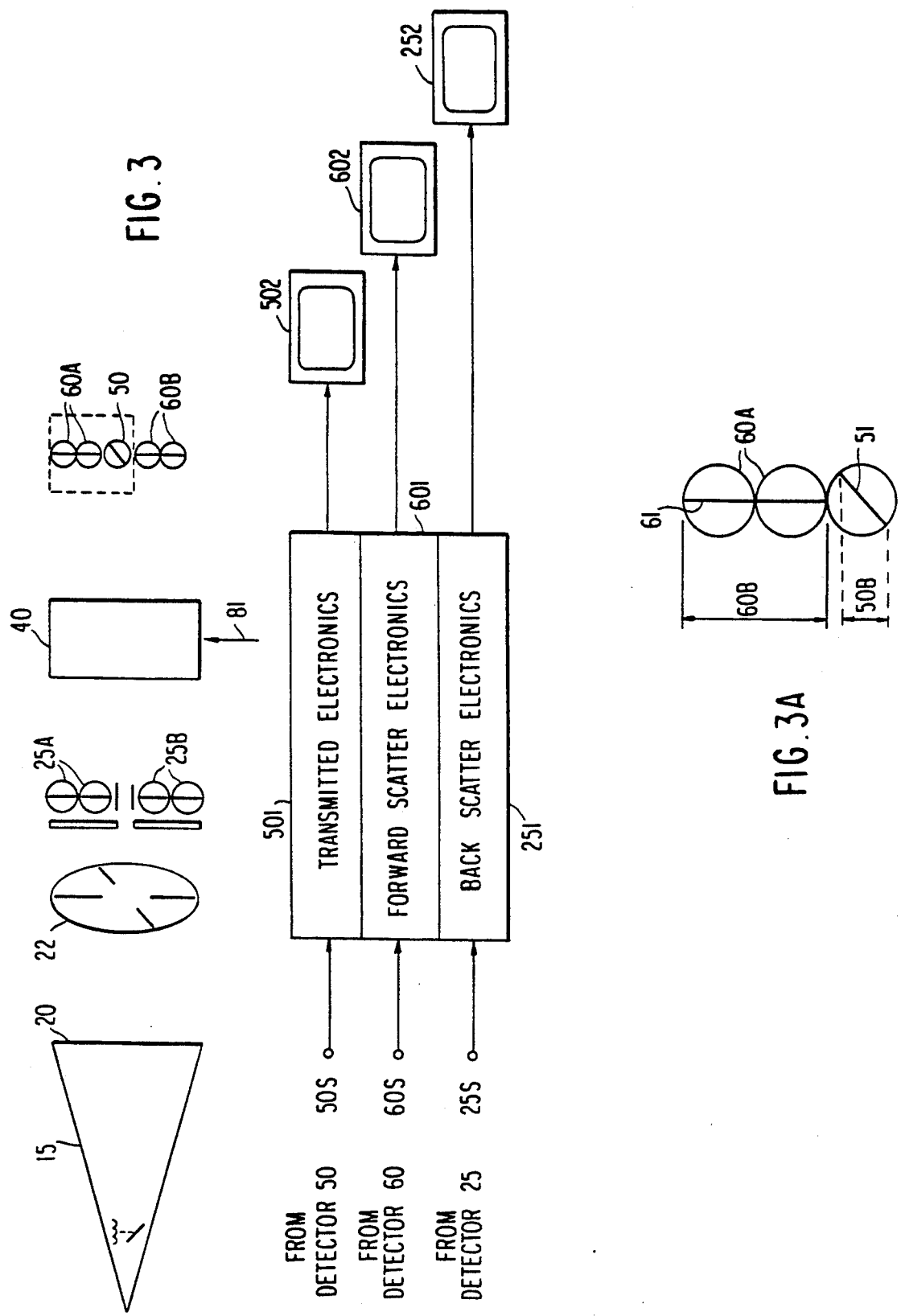

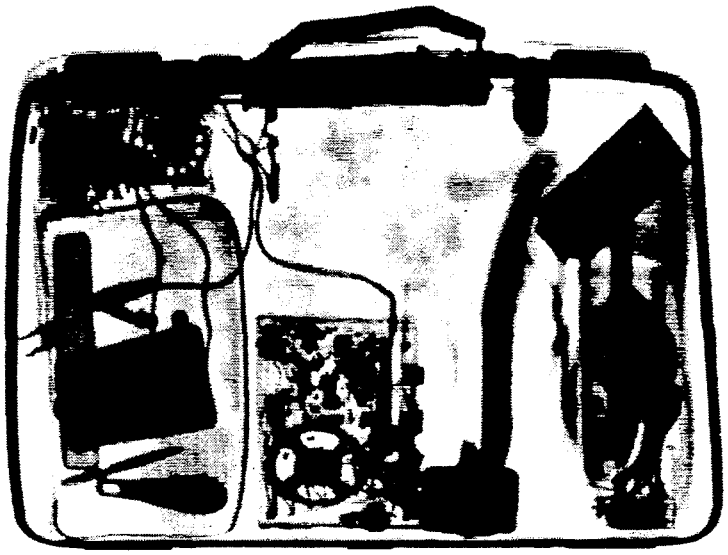
02    03    FIG.7
02    03    04         05
FIG.8

X-RAY IMAGING PARTICULARLY ADAPTED FOR LOW Z MATERIALS

This is a continuation of copending application Ser. No. 07/216,586, filed on Jul. 8, 1988, now abandoned, which is a continuation of co-pending application Ser. No. 876,632 filed on Jun. 20, 1986, now U.S. Pat. No. 4,799,247.

DESCRIPTION

1. Field of the Invention

The invention relates to radiant energy imaging which is particularly adapted to provide the viewer with information from which the presence of low Z materials in the object being imaged can be readily determined and the outline of such low Z material objects can be identified.

2. Background Art

Originally, x-radiation was employed in the medical field to image the human body for diagnostic purposes. Since that time the use of x-ray illumination and imaging have also been applied to the field generally referred to as non-destructive testing (or NDT, particularly directed at inanimate objects). Even more particularly, x-ray illumination and imaging has been used in the security field, especially at airports and other regions which are considered vulnerable, to detect entrance of articles which are considered dangerous. The use of x-ray illumination and imaging to detect relatively dense objects such as weapons, bombs, and the like has proved particularly useful. Experience has shown that a security officer or viewer can readily recognize certain distinct shapes (handgun for example) or shape relationships (bomb) if the x-ray imaging device provides a distinct image, something in the nature of a shadowgraph.

However, since the early application of x-ray illumination and imaging in the security field, it has generally been recognized that certain classes of materials which the security officer would like to detect are not susceptible to detection in accordance with prior art techniques. Generally, the problems arise because the articles do not produce clear shadowgraphs. One class of such materials is drugs and other narcotics; detection of this material is desired since the possession of this material is regulated by law. Other materials a security officer would like to detect but has so far been difficult to detect include edible materials such as fruits and vegetables. In addition, explosive material itself, the purpose for the detection of which should be apparent, is also not readily detected using conventional x-ray illumination and imaging. Even more recently new types of weapons have surfaced that also fail to be adequately detected; particularly weapons manufactured from plastics, as opposed to metals.

The materials specifically mentioned above have in common a relatively low atomic number (low Z). There are other materials that fall into the class of low Z materials for which detection is desirable but difficult with present day equipment and techniques.

It is therefore an object of the present invention to provide an improved x-ray illumination and imaging system which is particularly adapted for providing that information to the viewer which will enable the viewer to readily identify such low Z materials. It is another object to provide for a clear shadowgraph or projection radiograph to allow ready visualization of the shape of such object.

One conventional technique for detecting high Z materials which is employed in the prior art security field is exemplified by Stein et al U.S. Pat. Nos. 28,544 and 4,031,545 as well as Stein et al, "Flying Spot X-Ray Imaging Systems", appearing in Materials Evaluation, Vol. 30, No. 7, July 1972, pp. 137 et seq. Generally, the system described includes an x-ray source which forms a flying pencil beam arranged to scan a line in space. An x-ray detector is located at the line in space and the signals derived from the detector are used to drive a video display. The object to be imaged (whether animate or inanimate) is relatively slowly translated past the line in space so that the signals produced by the detector form, over a period of time, an x-ray shadowgraph. This detector will be hereinafter referred to as a forward transmitted ray detector, since it detects that x-radiation which passes through the object being imaged without changing direction. This type of system readily identifies high Z materials since those high Z materials readily absorb x-radiation. As a result, the shadowgraph or image produced on the video display can readily be used to identify the shape of any high Z material by the particular shape of the shadow the high Z material produces in the video display. FIG. 1 of U.S. Pat. No. 4,031,545 illustrates a typical image, as does FIG. 5 of the Stein et al publication.

The '544 patent states (col. 3, line 10):

"Although detector 25 [the forward transmitted detector] is shown behind the object being scanned for responding to the radiant energy transmitted through the object being scanned, it is within the principles of the invention to position the detector in the region between the radiant energy source and the object being scanned to respond to the scattered energy. This arrangement helps the apparatus detect concealed objects having different scattering characteristics from their surrounding."

The Stein et al publication mentions a back scatter detector and FIG. 3 is a picture of a video display showing a back scatter image. The '544 patent continues:

"Moreover, a system according to the invention may include both detecting means before and behind the object being scanned for simultaneously providing signals representative of both radiant energy transmission and scattering. Appropriately combining such signals may help increase the ability of the system to detect a wide variety of concealed objects."

The present invention has in common with the '544 patent the use of both a forward transmitted detector as well as a back scatter detector. Furthermore, in some embodiments of the present invention an additional detector, a forward scatter detector, is also employed. In some embodiments using the forward scatter detector, either the back scatter detector or the forward transmitted detector can be eliminated. Whereas the active region of the forward transmitted detector need only be as wide (in a first plane perpendicular to the direction between source and detector and, in that plane in a direction perpendicular to the scanning motion) as the illumination beam (since its purpose is only to detect illumination which is unchanged in direction from the direction in which it was emitted by the source), the active region of the back scatter detector is relatively wider (in a parallel direction in a second plane parallel to the first plane) since its purpose is to detect back scattered energy. Since the scattering angle can vary, the active region of the back scatter detector is preferably increased in dimension, in the parallel plane and perpendicular to the scanning motion. The forward scatter detector is also designed to detect scattered energy, i.e. energy coming from the object at varying angles. Accordingly, while the forward scatter detector will lie in or near the first plane, it has increased dimensions like the back scatter detector and unlike the forward transmitted detector.

In contrast to the '544 patent, however, the present invention does not combine the signals produced by any detector with signals produced by any other detector. Rather, the signal produced by each of the detectors employed in the present invention is separately, independently and simultaneously displayed in the form of a video image. The images are independent in the sense that each image is produced by the respective signal, without addition of any other data. The signals, however, are the result of a common illuminating beam. Applicants have found, for reasons explained below, that attempts to combine the signals from different detectors has the drawback of obscuring significant information which was contained in the signals, individually. Applicants have demonstrated that such low Z materials as plastic weapons, narcotics or other organic material can be readily identified by:

1) generating a flying pencil beam as described in the '544 patent,
2) appropriately locating and generating signals from at least two detectors included within the set of a forward transmitted detector, a forward scatter detector and a back scatter detector, by
3) separately, independently and simultaneously displaying images derived from a chosen pair, or all three, of the signals produced by the detectors.

In a preferred embodiment, designed to meet security needs, the object is scanned the signals generated by the detectors are displayed in real time. However, for other purposes, (such as NDT or the like) the detector signals may be recorded in real time, played back and displayed at a later time.

Accordingly, in one aspect the invention provides a projection imaging system for inspecting objects for highlighting low Z materials comprising:

a) a source of penetrating radiation,
b) means for forming the radiation emitted by said source into a beam of predetermined cross section and for repeatedly sweeping said beam across a line in space,
c) means for moving said object to be imaged relative to said source in a direction perpendicular to said line in space,
d) first radiant energy detector means located to be responsive to radiant energy penetrating said object and emerging from said object, substantially unchanged in direction, for producing first electrical signals,
e) second radiant energy detector means located further from said source than said object and responsive to radiant energy scattered by said object for producing second electrical signals, and
f) display means responsive to said electrical signals for separately, independently and simultaneously displaying said electrical signals as a function of time.

In another embodiment the invention provides an imaging system for inspecting objects for highlighting low Z materials comprising:

a) a source of penetrating radiation
b) means for forming radiation emitted by said source into a beam of predetermined cross-section and for repeatedly sweeping said beam across a line in space,
c) means for moving said object to be imaged relative to said source in a direction perpendicular to said line in space,
d) first radiant energy detector means located to be responsive to radiant energy penetrating said object and emerging from said object, substantially unchanged in direction, for producing first electrical signals,
e) second radiant energy detector means located closer to said source than said object and responsive to radiant energy scattered by said object for producing second electrical signals,
f) display means responsive to said electrical signals for separately, independently and simultaneously displaying said electrical signals as a function of time.

As a further alternative, the invention provides an imaging system for inspecting objects for highlighting low Z materials comprising:

a) a source of penetrating radiation,
b) means for forming radiation emitted by said source into a beam of predetermined cross-section and for repeatedly sweeping said beam across a line in space,
c) means for moving said object to be imaged relative to said source in a direction perpendicular to said line in space,
d) first radiant energy detector means located further from said source than said object and responsive to radiant energy scattered by said object for producing first electrical signals,
e) second radiant energy detector means located closer to said source than said object and responsive to radiant energy scattered by said object for producing second electrical signals, and
f) display means responsive to said electrical signals for separately, independently and simultaneously displaying said pair of electrical signals as a function of time.

Finally, the invention provides an imaging system for inspecting objects for highlighting low Z materials comprising:

a) a source of penetrating radiation,
b) means for forming radiation emitted by said source into a beam of predetermined cross-section and for repeatedly sweeping said beam across a line in space,
c) means for moving said object to be imaged relative to said source in a direction perpendicular to said line in space,
d) first radiant energy detector means located to be responsive to radiant energy penetrating said object and emerging from said object, substantially unchanged in direction, for producing first electrical signals,
e) second radiant energy detector means located further from said source than said object and responsive to radiant energy scattered by said object for producing second electrical signals,
f) third radiant energy detector means located closer to said source than said object and responsive to radiant energy scatted by said object for producing third electrical signals, and g) display means responsive to at least a pair of said electrical signals for separately, independently and simultaneously displaying said pair of electrical signals as a function of time.

BRIEF DESCRIPTION OF THE DRAWINGS

The present invention will now be described in further detail so as to enable those skilled in the art to practice the invention, in the following portions of this specification when taken in conjunction with the attached drawings in which like reference characters identify identical apparatus and in which:

FIG. 3 is a schematic illustration of an embodiment of the invention which employs a transmitted ray detector, a back scatter ray detector and a forward ray detector and associated displays; FIG. 3A is an enlargement of one portion of FIG. 3 showing detectors in detail;

FIGS. 7 and 8 are respectively images produced by forward transmitted and back scatter detector in accordance with the invention.

DETAILED DESCRIPTION OF PREFERRED EMBODIMENTS

Figure 1:
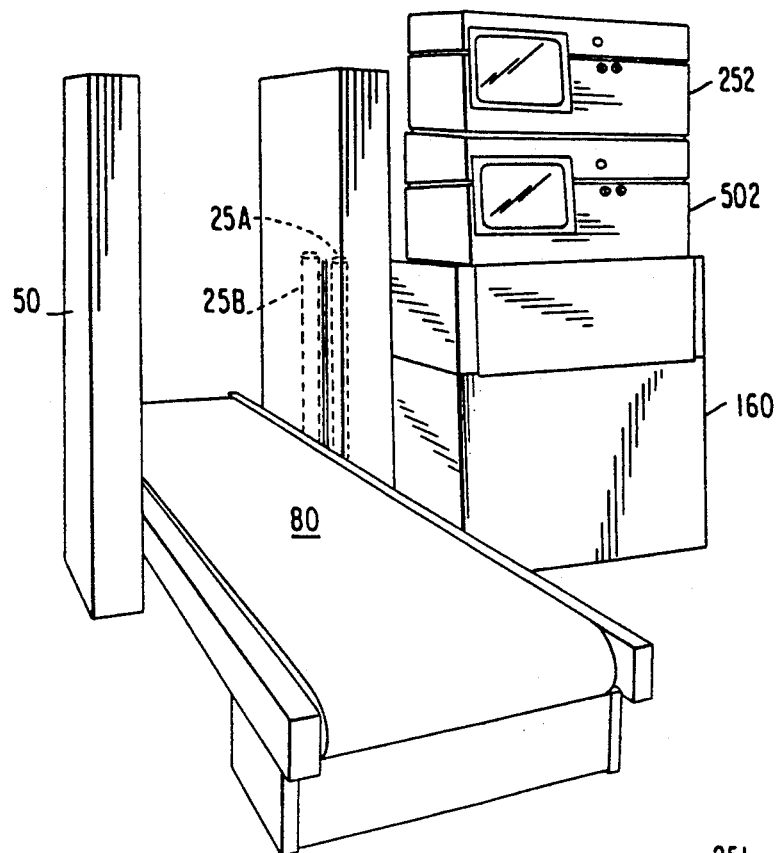
FIGS. 1 and 2 are respectively three dimensional and schematic illustrations of an embodiment of the invention which employs a transmitted ray detector and a back scatter ray detector respectively along with associated displays.

FIGS. 1 shows an isometric illustration of an embodiment of the invention which relies on simultaneous forward transmitted and back scattered x-ray detection to produce respectively independent, forward transmitted and back scatter images. More particularly, a housing 160 is located adjacent a conveyor 80; the housing 160 includes an x-ray source and apparatus for forming, from the radiation emitted by the source, in turn, a sheet beam and then a flying pencil beam.

Figure 2:
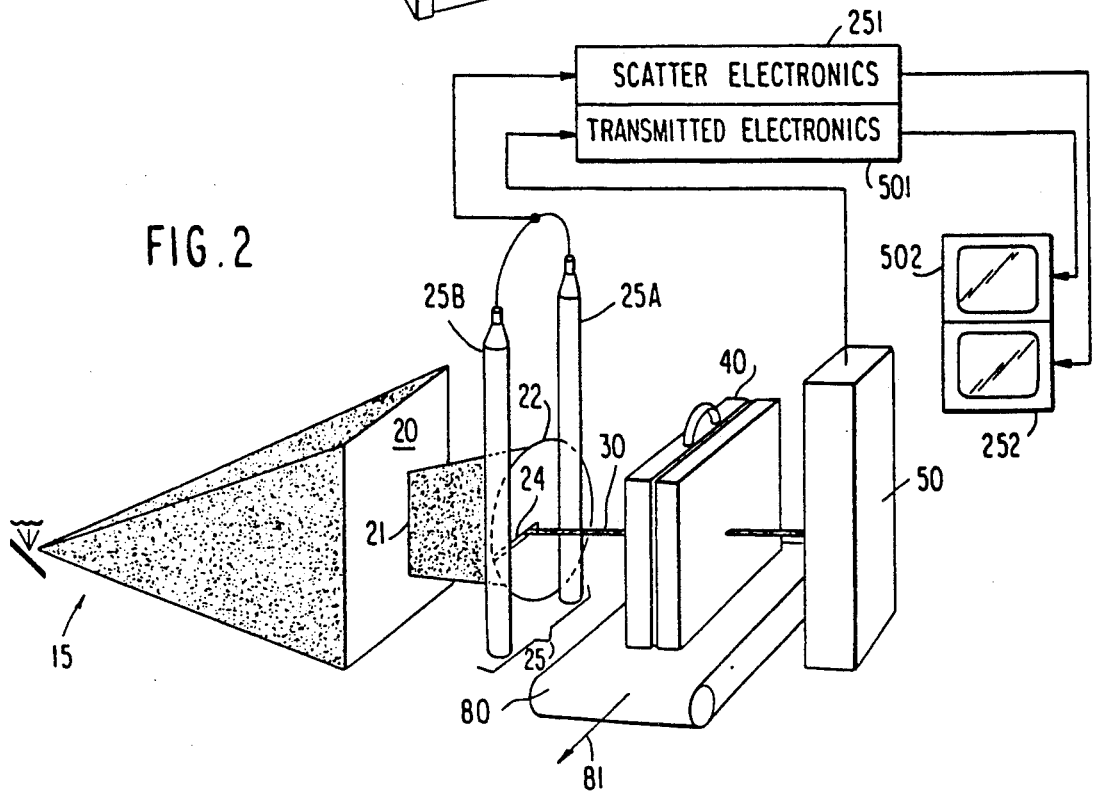

The apparatus is arranged so that the pencil beam repeatedly sweeps a line in space at which is located a transmitted ray detector 50. Adjacent the locus along which the flying pencil beam emerges, is a back scatter detector 25 comprising detector elements 25A and 25B, located on either side of the slit through which the flying pencil beam emerges. The housing 160 also includes electronics for responding to signals produced by the forward transmitted detector 50 and the back scatter detector 25. In general, the electronics provides for analog to digital conversion and sampling, in order to generate an electrical signal capable of driving a video display. Housed atop or adjacent the equipment cabinet 160 are the forward transmitted ray display 502 and the back scatter display 252. The operative components shown in FIG. 1 are more revealingly illustrated in FIG. 2 which is a schematic illustration of the same components. More particularly, an x-ray source 15 produces a cone or fan of x-radiation which is directed at radiation opaque plate 20 with a slit 21 therein. The slit 21 allows a sheet-like x-ray beam to pass to a rotating disk 22 having one or more slits such as slit 24 located therein. As is described in the '544 patent, the sheet beam emerging from the plate 20 has a dimension sufficient to illuminate approximately half the surface area of the rotating slotted wheel 22. As the slotted wheel 22 rotates, a slit 24 intercepts the sheet beam allowing a pencil beam 30 to pass. As the wheel rotates, the pencil beam 30 emitted by the slit 24 traverses a line in space. Located along that line in space is the transmitted ray detector 50. The detector 50 is located beyond the wheel 22 by a sufficient distance so that an object to be imaged such as the object 40 can pass therebetween. The conveyor 80 provides for motion of the object 40 in a direction 81 generally mutually perpendicular to the line in space at which the detector 50 is located and to the direction of the pencil beam. Commensurate with the rotation of the wheel 22, the pencil beam 30 scans the line in space occupied by the detector 50. The conveyor 80 provides for motion of the object 40 perpendicular to this line in space in the direction 81 at such a rate that the transmitted beam emerging from the object 40 can be used to generate a shadowgraph of the object 40 and its contents. The combined scanning action of the pencil beam 30 and relative motion of the object in the direction effects a raster scanning of the object by the pencil beam 30. To the extent that FIG. 2 illustrates an x-ray source, a means for forming a flying pencil beam, a forward transmitted detector, associated electronics and display, those components may be identical to the apparatus shown in the '544 patent. In addition, however, FIG. 2 shows that a back scatter detector 25 has been added, which is located closer to the source 15 than is the object 40. Preferably, the back scatter detector 25 may be formed into two components such as the detector elements 25A and 25B, located on either side of the slit through which the flying pencil beam emerges from the source 15. Furthermore, shielding is provided so that the detector 25 (or more particularly the elements 25A and 25B) are not exposed to direct illumination from the flying pencil beam 30. The detector elements 25A and 25B respond to back scattered radiation (to be described in connection with FIG. 4) and develop signals corresponding thereto. These signals are provided to the scatter electronics 251 where they may be summed and used to develop a video signal for driving a scatter imaging device or display 252.

As has already been described, the invention contemplates using a single source to generate the flying pencil beam and at least two detectors of a set of three. The embodiment of FIGS. 1 and 2 shows those two detectors as a transmitted ray detector 50 and a back scatter detector 25. FIG. 3 is a schematic illustration of another embodiment of the invention which employs all three detectors. More particularly, the same reference characters in FIG. 3 identify apparatus corresponding to that shown in FIG. 2. FIG. 3 differs from the embodiment of FIGS. 1 and 2 by including a forward scatter detector comprising detector elements 60A and 60B. As seen in FIG. 3A the forward scatter detector elements 60A and 60B are substantially coplanar with the forward transmitted ray detector 50, although that is not essential. However, both forward scatter detector and transmitted ray detector 50 are further from the source 15 than the object. The signals generated by the forward scatter detector 60 are input to a forward scattered electronics 601 where by may be summed to drive a display 602. In general, the transmitted electronics section 501, the forward scattered electronics 601 and back scattered electronics section 251 can be identical, providing for the analog to digital conversion and sampling functions already described to generate appropriate video signals. The only difference between these electronics sections is the signals which drive them. FIG. 3 shows that the signals from each of the detectors (the forward transmitted detector 50, the forward scatter detector 60 and the back scatter detector 25) are separately and independently used to generate corresponding video images displayed in the display devices 502, 602 and 252, respectively.

FIG. 3A is an enlargement of the region of FIG. 3 shown in dotted outline, and includes one element 60A of the forward scatter detector and the forward transmitted detector 50. As shown in FIG. 3A, the element 60A includes an active element 61. The active element 61 has an active region which extends in two dimensions, one of those dimensions is perpendicular to the plane of the illustration, the other dimension is parallel to the arrow 60B. The length of the arrow 60B shows the length of this dimension of the active region of the elements 61. In contrast, in accordance with one embodiment of the invention the forward transmitted detector 50 may consist of a detector (with an active element 51) in all other respects similar to the element 60A, but rotated (about an axis perpendicular to the sheet of the illustration) such that one dimension of the effective active region corresponds to the arrow 50B; it should be apparent that in this dimension the effective active regions of the elements 61 and 51 are significantly different. This illustrates that the forward transmitted detector element 51 need only have a sufficient effective active region to encompass the dimensions (50B) of the illuminating pencil beam 30. On the other hand, it is preferable that the effective active regions of the scatter detectors be significantly larger since their purpose is to capture energy which may be scattered at widely varying angles. Thus the transmitted detector 50 has a dimension substantially equal to one dimension of the cross-section of beam 30; the scatter detector 25 and forward scatter detectors have all dimensions substantially larger than any dimension of the cross-section of beam 30.

It is also within the scope of the invention to modify the embodiment of FIG. 1 by replacing the back scatter detector 25 with a forward scatter detector, so that the images displayed correspond to the transmitted and forward scattered images, respectively. It is also within the scope of the invention to modify FIG. 3 for example by eliminating the transmitted ray detector 50 and the associated electronics so that only two images are displayed, corresponding to forward scattered and back scattered images, respectively.

In accordance with the invention, it is essential that the two (or three) images that are derived be derived from the same flying spot x-ray beam which is a well-defined single beam. This ensures that the signal from any detector is associated with only one line of sight through the object being imaged, at any instant of time.

As has already been described, the transmitted image is in effect a shadowgraph as described in the '544 patent. The back scattered and forward scattered images, conversely, result from x-rays being scattered (particularly by Compton scattering) into the respective detectors (either forward or back).

Figure 6:
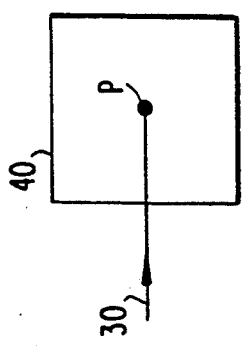
FIGS. 4-6 schematically illustrate the events which occur interior of an object being imaged in response to illuminating radiation 30, and more specifically, a back scattering event, a forward scattering event and an absorption event, respectively.
Figure 5:
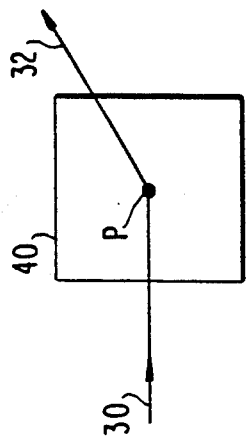
Figure 4:
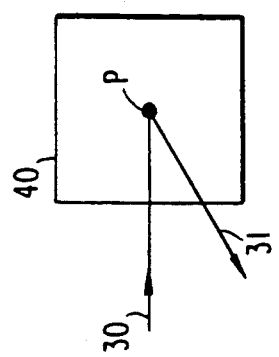

The advantage of the invention can be understood by reviewing the sequence of events from which a single element or pixel of the image is formed. Referring first to FIG. 4, the pencil beam 30 is illustrated as partially penetrating the object 40 until it reaches a point P. In the course of its travel through the object 40, the pencil beam 30 is attenuated, and the extent of the attenuation depends upon the material lying in the path of the beam. The attenuation may be due to pure absorption (in which case one or more x-ray photons are completely removed, FIG. 6, from the beam and cannot contribute to any image direct or scattered) or the attenuation may also be due to scattering. To the extent that some photons do not reach the transmitted detector for a particular line of sight, then the resulting image reflects the absence of those photons. In the following description we assume that those photons reaching the detector whiten the image; this type of processing is traditional but not essential. We could just as easily use the presence of photons reaching the detector to darken the image; the important consideration is the contrast produced in the image, inadequate contrast will make it difficult or impossible to produce a recognizable image. We continue, assuming the traditional processing, dense objects will darken the image in a pattern corresponding to their shadow. For less dense objects, the effect may not provide enough contrast to recognize a shape. Some photons will be scattered (FIG. 4 or FIG. 5), to the extent that the scattered beam is not captured by a detector, it too does not contribute to the image. To the extent that the beam is captured by a detector, then it will contribute to the image formed by the detector at which it is captured. In any case, the attenuated beam, as it reaches each depth within the object, may scatter. The scattered photon, in turn, may reach the detector only if it in turn, is not absorbed or scattered (redirected so as to miss a scatter receptive detector). Thus the probability of "seeing" a small sample within the object depends on three factors, as follows:

1) the probability of the absorption of an x-ray photon by the portion of the object traversed by the beam before it reaches the sample,
2) the probability of scattering an x-ray photon within the sample, and
3) the probability that the scattered x-ray photon is absorbed (or scattered away from the appropriate scatter detector) on its way out of the object.

Now we can consider the relative scattering signal of a pure high Z material and pure low Z material. Generally speaking, all materials have similar scattering probability per unit weight. Thus, if the two materials have the same density, factor 2 would be the same regardless of the atomic number (Z). However, a high Z material would have a much higher absorption probability for x-ray photons in a practical energy range (for example from 30 Kev to 100 Kev) depending on the respective atomic numbers. Accordingly, the probabilities identified as 1 and 3 are very different for high Z and low Z materials. High Z materials absorb more x-ray photons than low Z materials, resulting in a much stronger signal per unit mass from low Z materials. Accordingly, low Z materials in a back scattered image are much more conspicuous whereas high Z materials are more conspicuous in the transmitted image. Accordingly, the two images together provide the user with a much better picture of the contents of the object, or its interior construction.

Although the discussion immediately above applies to a comparison of forward transmitted and back scattered events, similar reasoning applies to forward transmitted and forward scattered events. That is, the forward scattered image will tend to highlight low Z materials whereas the transmitted image will highlight high Z materials. It would be inappropriate to simply sum the forward scattered image signal and the back scattered image signal because the back scatter image is much brighter and therefore less noisy than the forward scatter image. If the forward scatter image signal was merely added to the back scattered image signal, much of the information in the forward scattered image signal would be lost. The weaker forward scattered image signal, when displayed alone, shows a good definition of low Z materials.

The forward scattered image signal is weaker than the back scattered image signal in that all of the x-ray photons making up the forward scattered image signal must penetrate at least the entire object on the way to the forward scattered detector. Thus, the forward scatter image is subject to attenuation by that portion of the object between the scattering locus and the detector. It would also be inappropriate to sum the forward transmitted and any scatter signal. Since they highlight different materials, summing the signals would reduce the effectiveness of the result as compared to either signal alone.

Accordingly, in employing the embodiment of the invention shown in FIGS. 1 and 2, the transmitted image display 502 shows the conventional image that would have been shown by the display discussed in the '544 patent. On the other hand, the display 252 highlights low Z materials in that it preferentially is made up of more photons scattered from low Z materials than from high Z materials. The mental correlation by the viewer of the images displayed in the displays 502 and 252 provide a more useful picture of the contents of the object 40 than would be provided simply by the display 502 or the display 252, alone. Whereas the '544 patent suggests combining the forward transmitted and back scattered signals, for reasons discussed above, that is believed inappropriate.

The transmitted images on the one hand and the scattered (either forward or back) images on the other hand can be differentiated in a different light. Visualizing the shape of a component in the x-ray illumination of an object requires the differentiation of the shape of the component from the background (from other different components which also lie in the path of the x-ray beam between the source and detector). In the case of the transmitted detector, the shapes we see are due to a component of an object preventing (either absorbing or scattering) x-ray photons from reaching the detector. Thus, in general the background is white or light (with the traditional processing referred to earlier), and the object visualized is black or dark. The more the component absorbs or scatters x-rays, the better will be its definition (i.e. contrast). For the scatter detectors and images, however, the situation is different. If there is no mass to scatter, the resultant background is black. If, however, a material scatters photons, the resultant portion of the image is white. Therefore, an object will appear in the transmission image if it either scatters or absorbs but will appear in the scatter image if and only if it scatters. The ratio of scattering to absorption is a critical parameter for the determination of how the image appears. This ratio changes dramatically with Z in the energy range of interest here. For low Z materials scatter dominates and for high Z material absorption dominates.

The image produced by the scatter detectors depends of course not only on each sample (whether high Z or low Z) but also on the intervening components between the "sample" and the detector. There will be, in general, much more mass between the back scatter detector and the components of the object lying far from the back scatter detector than there will be between the back scatter detector and the components of the object lying near the back scatter detector. Of course, the opposite is true for the forward scatter detector, e.g. there is much more mass between "samples" located far from the forward scatter detector than there will be between "samples" lying near to the forward scatter detector. Hence in general the back scatter detector will preferentially display low Z materials lying closer to the back scatter detector whereas the forward scatter detector will preferentially display low Z materials lying closer to the forward scatter detector.

FIGS. 7 and 8 illustrate the preferential display ability of the signals produced by the transmitted detector and back scatter detector, respectively. The illustrations in FIGS. 7 and 8 were derived from signals generated by a transmitted ray detector and a back scatter detector viewing an object illuminated in accordance with the invention, e.g. by using the common flying spot scanning pencil beam. FIG. 7 shows the contents of an attache case, clearly illuminating or differentiating the shape of high Z materials. This includes the umbrella O1, a travel case O2 and a portable radio O3. Note that in each instance the high Z components are emphasized, for example the speaker cone of the portable radio O3, the metal components of the umbrella O1 and the metal components of the travel case O2. Likewise, the can of shaving cream O6. As indicated above, the background or regions of the object not occupied by high Z materials is relatively white or light, such that any low Z materials are difficult to identify or visualize. Referring now to FIG. 8, in the image developed from back scatter signals some of the same objects can be identified, e.g. the umbrella O1 is also present, but note in this image the relatively lower Z handle is emphasized as opposed to the emphasis of the metal components in the image of FIG. 7. Similarly, the travel case O2 is also recognizable, but in this case the low Z components are more readily identifiable than the higher Z components of the object O2 in FIG. 7. The same is true for the portable radio O3. For example, in FIG. 8 we can no longer see the metal speaker cone. FIG. 8 shows us components of the object which are not visible in FIG. 7. While the shoes or slippers O5 are visible in FIG. 8, more impressive is the visualization of the handgun O4. The handgun O4 in FIG. 8 is a plastic handgun and comparison between FIGS. 7 and 8 indicates how much more visible the handgun O4 is in FIG. 8 than it is in FIG. 7.

A similar comparison applies to an embodiment of the invention which relies on the transmitted display 502 and the forward scattered display 602 with the difference that the forward scattered display 602 will preferentially provide an image from low Z materials located closer to the forward scattered detector than would the image provided by the back scatter detector 25. Thus for the same reasons use of the invention with the transmitted display 502 and the forward scattered display 602 provides the user with information above and beyond that which would be provided by the single transmitted ray display of the '544 patent.

In still another embodiment of the invention wherein the forward scattered detector and back scatter detector, alone, are employed the displays 602 and 252 provide the user with highlighted information concerning low Z materials. The back scatter detector highlights low Z materials closer to the source whereas the forward scatter detector highlights low Z materials further from the source.

Finally, the embodiment of the invention shown in FIG. 3 provides the user with still additional information by reason of the presence of the transmitted display 502.

Embodiments of the invention which have already been described produce images essentially in "real time". These are typically employed at airports and other similar regions where the owner of the object allows its inspection to gain access and hence quick inspection is advantageous. Other embodiments, however, do not necessarily require this "real time" feature. In other applications (for example nondestructive testing) it may not be necessary to view images created at the same time as the object is being illuminated.

Figure 9:
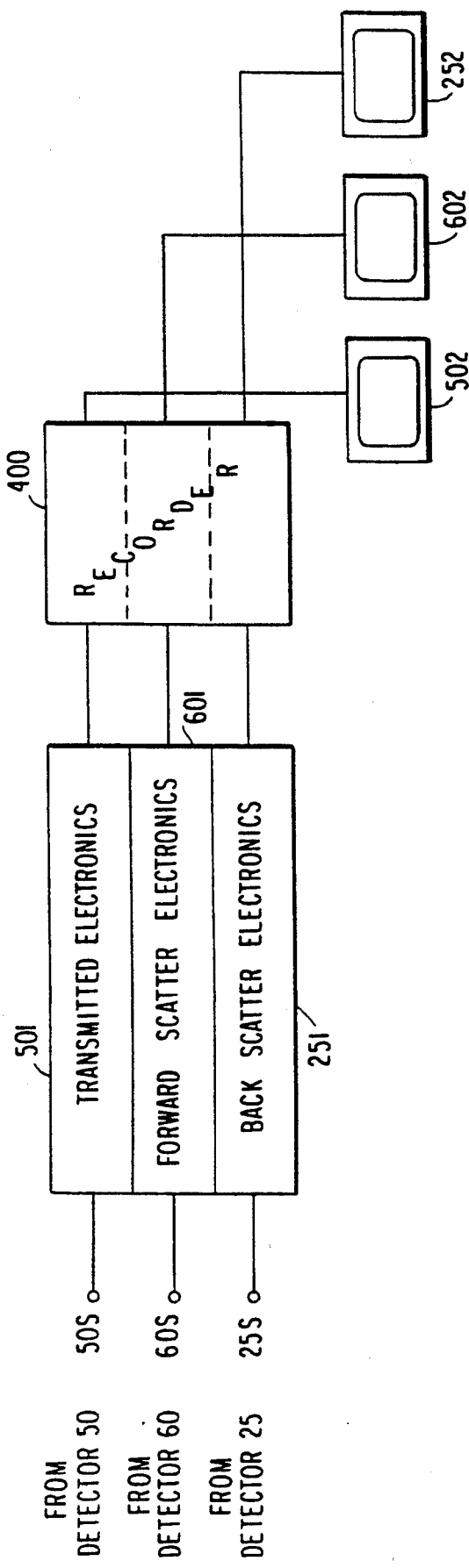
FIG. 9 is an illustration of an embodiment similar to FIG. 3 with the addition of a recorder 400.

In those circumstances, the signals, which are necessarily created in "real time" may be recorded using conventional recording apparatus. Thereafter, the images can be reproduced from the signals by replaying the record made on the recording device. FIG. 9 is similar to FIG. 3 except that a recorder 400 is driven by the electronics 501, 601 and 251 to record signals produced in real time. The recorder 400 can then play the recorded signals back at any time to drive the displays 502, 602 and 252. Obviously the recorder 400 can be used with other embodiments of the invention in a similar fashion. It should also be apparent that other and still further variations can be employed within the spirit and scope of the invention which is to be construed in accordance with the attached claims.

Having thus described our invention, what we claim as new, and desire to secure by Letters Patent is:

1. An imaging system for inspecting an object to detect the presence and shape of high Z and low Z material components of said object to facilitate simultaneous detection of high z components such as metal weapons and low z components such as narcotics, explosives and plastic weapons, said system comprising:
   a) a source of penetrating radiation,
   b) means for forming radiation emitted by said source into a beam of predetermined cross-section,
   c) means for scanning said beam across said object to be inspected,
   d) means for moving said object relative to said source of radiation,
   e) first radiant energy detector means located to be responsive to radiant energy penetrating said object and emerging from said object, substantially unchanged in direction, for producing first electrical signals primarily representative of high Z material components of said object,
   f) second radiant energy detector means responsive to radiant energy scattered by said object for producing second electrical signals primarily representative of low Z material components of said object, and
   g) display means responsive to said first and second electrical signals for separately, independently and simultaneously producing first and second separate visual displays, said display means including a first display means responsive only to said first electrical signals to produce said first visual display representative of the high z material components of the object, a second display means responsive only to said second electrical signals to produce said second visual display representative of the low z material components of the object, said first and second display means located closely adjacent to one another to facilitate comparison of said first and second visual displays with one another,
   wherein said first radiant energy detector means includes a radiant energy detector with the dimension of an effective active region substantially identical to one dimension of said beam cross-section and in which said second radiant energy detector means includes a radiant energy detector with all dimensions of an effective active region substantially larger than any dimension of said beam cross-section.

2. An imaging system for inspecting an object to detect the presence and shape of high Z and low Z material components of said object to facilitate simultaneous detection of high z components such as metal weapons and low z components such as narcotics, explosives and plastic weapons, said system comprising:
   a) a source of penetrating radiation,
   b) means for forming radiation emitted by said source into a beam of predetermined cross-section and for repeatedly sweeping said beam across a line in space,
   c) means for moving an object to be imaged relative to said source in a direction perpendicular to said line in space,
   d) first radiant energy detector means located to be responsive to radiant energy penetrating said object and emerging from said object, substantially unchanged in direction, for producing first electrical signals primarily representative of high Z material components of said object,
   e) second radiant energy detector means located nearer to said source than said object and responsive to radiant energy scattered by said object for producing second electrical signals primarily representative of low Z material components of said object, and
   f) first and second display means responsive respectively to said first and second electrical signals for separately, independently and simultaneously producing first and second separate visual displays that are representative respectively of the high Z and low Z material components of said object, said first and second display means located closely adjacent to one another to facilitate comparison of said first and second visual displays with one another,
   wherein said first radiant energy detector means includes a radiant energy detector with the dimension of an effective active region substantially identical to one dimension of said beam cross-section, and in which said second radiant energy detector means includes a radiant energy detector with all dimensions of an effective active region substantially larger than any dimension of said beam cross-section.

3. A method of inspecting an object to detect the presence and shape of high Z and low Z material components of said object to facilitate simultaneous detection of high z components such as metal weapons and low z components such as narcotics, explosives and plastic weapons, said method comprising:
   a) scanning a beam of penetrating radiation across an object being inspected,
   b) moving said object relative to said scanning beam, c) during the scanning of said beam, detecting first radiant energy that penetrates and emerges from said object substantially unchanged in direction, d) in response to said first radiant energy, generating first electrical signals that are primarily representative of high Z material components of said object, e) during the scanning of said beam, detecting radiant energy that is scattered by said object, f) in response to said scattered radiant energy, generating second electrical signals that are primarily representative of low Z material components of said object, g) using said first electrical signals to generate a first visual display that is primarily representative of the high Z material components of said object, and h) simultaneous with the generation of said first visual display, using said second electrical signals to generate a second visual display that is primarily representative of low Z material components of said object, said second visual display being separate from but adjacent to said first visual display, wherein said step (e) comprises detecting said scattered radiant energy in a detector with an effective detecting region substantially greater in dimension than a detection region of a detector detecting said first radiant energy.

4. A method of inspecting an object to detect the presence and shape of high Z and low Z material components of said object to facilitate simultaneous detection of high z components such as metal weapons and low z components such as narcotics, explosives and plastic weapons, said method comprising:

a) scanning a beam of penetrating radiation across an object being inspected, b) moving said object relative to said scanning beam, c) during the scanning of said beam, detecting first radiant energy that penetrates and emerges from said object substantially unchanged in direction, d) in response to said first radiant energy, generating first electrical signals that are primarily representative of high Z material components of said object, e) during the scanning of said beam, detecting radiant energy that is scattered by said object, f) in response to said scattered radiant energy, generating second electrical signals that are primarily representative of low Z material components of said object, g) using said first electrical signals to generate a first visual display that is primarily representative of the high Z material components of said object, and h) simultaneous with the generation of said first visual display, using said second electrical signals to generate a second visual display that is primarily representative of low Z material components of said object, said second visual display being separate from but adjacent to said first visual display, wherein said step (e) comprises detecting said scattered radiant energy in a detector with an effective detecting region substantially greater in dimension than any cross sectional dimension of said beam of penetrating radiation.

5. An imaging system for inspecting an object to detect the presence and shape of high Z and low Z material components of said object to facilitate simultaneous detection of high z components such as metal weapons and low z components such as narcotics, explosives and plastic weapons, said system comprising:

a) a source of penetrating radiation of energy level selected to generate Compton scatter, b) means for forming radiation emitted by said source into a beam of predetermined cross-section, c) means for scanning said beam across said object to be inspected, d) means for moving said object relative to said source of radiation, e) first radiant energy detector means located to be responsive to radiant energy penetrating said object and emerging from said object, substantially unchanged in direction, for producing first electrical signals primarily representative of high Z material components of said object, f) second radiant energy detector means responsive to Compton scatter generated by said object for producing second electrical signals primarily representative of low material components of said object, and g) display means responsive to said first and second electrical signals for separately, independently and simultaneously producing first and second separate visual displays, said display means including a first display means responsive only to said first electrical signals to produce said first visual display representative of the high z material components of the object, a second display means responsive only to said second electrical signals to produce said second visual display representative of the low z material components of the object, said first and second display means located closely adjacent to one another to facilitate comparison of said first and second visual displays with one another, wherein said first radiant energy detector means includes a radiant energy detector with the dimension of an effective active region substantially identical to one dimension of said beam cross-section and in which said second radiant energy detector means includes a radiant energy detector with all dimension of an effective active region substantially larger than any dimension of said beam cross-section.

6. An imaging system for inspecting an object to detect the presence and shape of high Z an low Z material components of said object to facilitate simultaneous detection of high z components such as metal weapons and low z components such as narcotics, explosives and plastic weapons, said system comprising:

a) a source of penetrating radiation of energy level selected to generate Compton scattered energy, b) means for forming radiation emitted by said source into a beam of predetermined cross-section and for repeatedly sweeping said beam across a line in space, c) means for moving an object to be imaged relative to said source in a direction perpendicular to said line in space, d) first radiant energy detector means located to be responsive to radiant energy penetrating said object and emerging from said object, substantially unchanged in direction, for producing first electrical signals primarily representative of high Z material components of said object, e) second radiant energy detector means located nearer to said source than said object and responsive to Compton scattered energy scattered by said object for producing second electrical signals primarily representative of low Z material components of said object, and f) first and second display means responsive respectively to said first and second electrical signals for separately, independently and simultaneously producing separate first and second visual displays that are representative respectively of the high Z and low Z material components of said object, said first and second display means being located closely adjacent to one another to facilitate comparison of said first and second visual displays with one another, wherein said first radiant energy detector means includes a radiant energy detector with the dimension of an effective active region substantially identical to one dimension of said beam cross-section, and in which said second radiant energy detector means includes a radiant energy detector with all dimension of an effective active region substantially larger than any dimension of said beam cross-section.

7. A method of inspecting an object to detect the presence and shape of high Z and low Z material components of said object to facilitate simultaneous detection of high z components such as metal weapons and low z components such as narcotics, explosives and plastic weapons, said method comprising:

a) scanning a beam of penetrating radiation across an object being inspected,
b) moving said object relative to said scanning beam,
c) during the scanning of said beam, detecting first radiant energy that penetrates and emerges from said object substantially unchanged in direction,
d) in response to said first radiant energy, generating first electrical signals that are primarily representative of high Z material components of said object,
e) during the scanning of said beam, detecting Compton scattered radiant energy that is scattered by said object,
f) in response to said scattered radiant energy, generating second electrical signals that are primarily representative of low Z material components of said object,
g) using said first electrical signals to generate a first visual display that is primarily representative of the high Z material components of said object, and
h) simultaneous with the generation of said first visual display, using said second electrical signals to generate a second visual display that is primarily representative of low Z material components of said object, said second visual display being separate from but adjacent to said first visual display, wherein said step (e) comprises detecting said scattered radiant energy in a detector with an effective detecting region substantially greater in dimension than a detecting region of a detector detecting said first radiant energy.

8. A method of inspecting an object to detect the presence and shape of high Z and low Z material components of said object to facilitate simultaneous detection of high z components such as metal weapons and low z components such as narcotics, explosives and plastic weapons, said method comprising:

a) scanning a beam of penetrating radiation across an object being inspected,
b) moving said object relative to said scanning beam,
c) during the scanning of said beam, detecting first radiant energy that penetrates and emerges from said object substantially unchanged in direction,
d) in response to said first radiant energy, generating first electrical signals that are primarily representative of high Z material components of said object,
e) during the scanning of said beam, detecting Compton scattered radiant energy that is scattered by said object,
f) in response to said scattered radiant energy, generating second electrical signals that are primarily representative of low Z material components of said object,
g) using said first electrical signals to generate a first visual display that is primarily representative of the high Z material components of said object, and
h) simultaneous with the generation of said first visual display, using said second electrical signals to generate a second visual display that is primarily representative of low Z material components of said object, said second visual display being separate from but adjacent to said first visual display, wherein said step (e) comprises detecting said scattered radiant energy in a detector with an effective detecting region substantially greater in dimension than any cross sectional dimension of said beam of penetrating radiation.

* * * * *

UNITED STATES PATENT AND TRADEMARK OFFICE
CERTIFICATE OF CORRECTION

PATENT NO.     : 5,313,511 C1
DATED          : January 30, 2001
INVENTOR(S)    : Annis et al.

It is certified that error appears in the above-identified patent and that said Letters Patent is hereby corrected as shown below:

Title page,
Item [73], Assignee, change "United States Trust Company" to -- American Science and Engineering, Inc. --

Column 1,
Line 15, change "1-3" to -- 1-3 and 5-7 --.
Please delete lines 20-21.

Signed and Sealed this

Ninth Day of April, 2002

Attest:

JAMES E. ROGAN
Attesting Officer   Director of the United States Patent and Trademark Office

UNITED STATES PATENT AND TRADEMARK OFFICE
CERTIFICATE OF CORRECTION

| | |
|---|---|
| PATENT NO. | : 5,313,511 C2 |
| APPLICATION NO. | : 90/009069 |
| DATED | : June 9, 2009 |
| INVENTOR(S) | : Martin Annis et al. |

It is certified that error appears in the above-identified patent and that said Letters Patent is hereby corrected as shown below:

On title page, item 73 Assignee,
replace "Silicon Valley Bank"
with "American Science and Engineering, Inc."

Signed and Sealed this

Twenty-first Day of July, 2009

JOHN DOLL
*Acting Director of the United States Patent and Trademark Office*

USOO5313511C1

(12) REEXAMINATION CERTIFICATE (4260th)
United States Patent
Annis et al.

(10) Number: US 5,313,511 C1
(45) Certificate Issued: Jan. 30, 2001

(54) X-RAY IMAGING PARTICULARLY ADAPTED FOR LOW Z MATERIALS

(75) Inventors: Martin Annis, Cambridge; Paul J. Bjorkholm, Sharon, both of MA (US)

(73) Assignee: United States Trust Company, Boston, MA (US)

Reexamination Request:
No. 90/005,266, Feb. 19, 1999

Reexamination Certificate for:
Patent No.: 5,313,511
Issued: May 17, 1994
Appl. No.: 07/809,246
Filed: Dec. 18, 1991

Related U.S. Application Data

(63) Continuation of application No. 07/216,586, filed on Jul. 8, 1988, now abandoned, which is a continuation of application No. 06/876,632, filed on Jun. 20, 1986, now Pat. No. 4,799,247.

(51) Int. Cl.[7] .................................................. G01N 23/201
(52) U.S. Cl. .................................. 378/87; 378/57; 378/90
(58) Field of Search ................................. 378/87, 57, 90, 378/86, 88, 89

(56) References Cited

U.S. PATENT DOCUMENTS

| Re. 28,544 | * | 9/1975 | Stein et al. ............................ 378/57 |
| 3,569,708 | | 3/1971 | Weinbaum . |
| 3,884,816 | | 5/1975 | Takahashi . |
| 4,047,029 | | 9/1977 | Allport . |
| 4,415,804 | | 11/1983 | Sowerby . |

OTHER PUBLICATIONS

"A Survey of X–ray Technology and Available System for Parcel Inspection", Richard G. Cumings, 1979.
"An X–ray Inspection System for Security Screening Application", W.K. Stefanski, et al. (1977).
Stein et al, "Flying Spot X–Ray Imaging Systems", Jul. 1972, Materials Evaluation, vol. XXX, No. 7, pp. 137–148.*

* cited by examiner

Primary Examiner—David P Porta

(57) ABSTRACT

An imaging device for increasing the ability to recognize, in x-ray produced images, materials of low atomic number. A flying spot scanner illuminates an object to be imaged in a raster pattern; the flying spot repeatedly sweeps a line in space, and the object to be imaged is moved so that the illuminating beam intersects the object. At least a pair of x-ray detectors are employed, each pair associated with signal processing apparatus and a display. The two detectors employed (and the associated electrons and display) are selected from a set of three which includes a transmitted detector located at the line in space which is repeatedly traversed by the pencil beam, a forward scatter detector which is located further from the x-ray beam than the object to respond to photons scattered by the object being illuminated out of the path of the beam, and a back scatter detector which is located closer to the x-ray source than the object being imaged and also arranged to detect photons scattered out of the beam path by the object. In another embodiment of the invention all three detectors and their associated electronics/displays are employed.

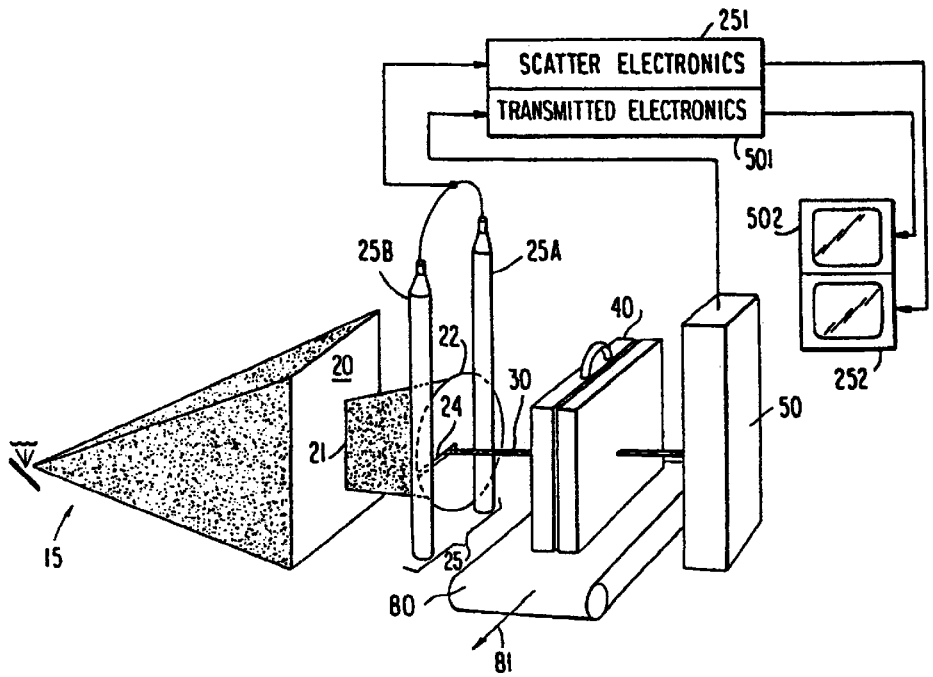

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–3 is confirmed.

Claims 4 and 8 are determined to be patentable as amended.

Claims 5–7, dependent on an amended claim, are determined to be patentable.

4. A method [of inspecting an object to detect the presence and shape of high Z and low Z material components of said object to facilitate simultaneous detection of high z components such as metal weapons and low z] *for simultaneously detecting materials, while contained within an enclosure, having an atomic number Z that is high and materials having a low atomic number, and for distinguishing high Z components such as metal weapons from low Z components* such as narcotics, explosives and plastic weapons, said method comprising:
  a) scanning a beam of penetrating radiation across an object being inspected,
  b) moving said object relative to said scanning beam,
  c) during the scanning of said beam, detecting first radiant energy that penetrates and emerges from said object substantially unchanged in direction,
  d) in response to said first radiant energy, generating first electrical signals that are primarily representative of high Z material components of said object,
  e) during the scanning of said beam, detecting radiant energy that is scattered by said object,
  f) in response to said scattered radiant energy, generating second electrical signals that are primarily representative of low Z material components of said object,
  g) using said first electrical signals to generate a first visual display that is primarily representative of the high Z material components of said object, and
  h) simultaneous with the generation of said first visual display, using said second electrical signals to generate a second visual display that is primarily representative of low Z material components of said object, said second visual display being separate from but adjacent to said first visual display,
  wherein said step (e) comprises detecting said scattered radiant energy in a detector with an effective detecting region substantially greater in dimension than any cross sectional dimension of said beam of penetrating radiation.

8. A method [of inspecting an object to detect the presence and shape of high Z and low Z material components of said object to facilitate simultaneous detection of high z components such as metal weapons and low z] *for simultaneously detecting materials, while contained within an enclosure, having an atomic number Z that is high and materials having a low atomic number, and for distinguishing high Z components such as metal weapons from low Z components* such as narcotics, explosives and plastic weapons, said method comprising:
  a) scanning a beam of penetrating radiation across an object being inspected,
  b) moving said object relative to said scanning beam,
  c) during the scanning of said beam, detecting first radiant energy that penetrates and emerges from said object substantially unchanged in direction,
  d) in response to said first radiant energy, generating first electrical signals that are primarily representative of high Z material components of said object,
  e) during the scanning of said beam, detecting Compton scattered radiant energy that is scattered by said object,
  f) in response to said scattered radiant energy, generating second electrical signals that are primarily representative of low Z material components of said object,
  g) using said first electrical signals to generate a first visual display that is primarily representative of the high Z material components of said object, and
  h) simultaneous with the generation of said first visual display, using said second electrical signals to generate a second visual display that is primarily representative of low Z material components of said object, said second visual display being separate from but adjacent to said first visual display,
  wherein said step (e) comprises detecting said scattered radiant energy in a detector with an effective detecting region substantially greater in dimension than any cross sectional dimension of said beam of penetrating radiation.

* * * * *

US005313511C2

(12) EX PARTE REEXAMINATION CERTIFICATE (6873rd)

United States Patent
Annis et al.

(10) Number: US 5,313,511 C2
(45) Certificate Issued: Jun. 9, 2009

(54) X-RAY IMAGING PARTICULARLY ADAPTED FOR LOW Z MATERIALS

(75) Inventors: Martin Annis, Cambridge, MA (US); Paul J. Bjorkholm, Sharon, MA (US)

(73) Assignee: Silicon Valley Bank, Santa Clara, CA (US)

Reexamination Request:
No. 90/009,069, Mar. 3, 2008

Reexamination Certificate for:
Patent No.: 5,313,511
Issued: May 17, 1994
Appl. No.: 07/809,246
Filed: Dec. 18, 1991

Reexamination Certificate C1 5,313,511 issued Jan. 30, 2001

Certificate of Correction issued Apr. 9, 2002.

Related U.S. Application Data

(63) Continuation of application No. 07/216,586, filed on Jul. 8, 1988, now abandoned, which is a continuation of application No. 06/876,632, filed on Jun. 20, 1986, now Pat. No. 4,799,247.

(51) Int. Cl.
*G01V 5/00* (2006.01)
*G21K 5/10* (2006.01)

(52) U.S. Cl. .............................. 378/87; 378/57; 378/90
(58) Field of Classification Search ........................ None
See application file for complete search history.

(56) References Cited

U.S. PATENT DOCUMENTS

| | | | |
|---|---|---|---|
| 3,780,291 A | 12/1973 | Stein et al. | 378/146 |
| 3,790,799 A | 2/1974 | Stein et al. | 378/146 |
| RE28,544 E | 9/1975 | Stein et al. | 250/369 |
| 4,031,545 A | 6/1977 | Stein et al. | 378/57 |
| 4,228,351 A | 10/1980 | Snow et al. | 378/54 |
| 4,247,774 A | 1/1981 | Brooks | 250/367 |
| 4,277,686 A | 7/1981 | Harding | 378/6 |
| 4,768,214 A | 8/1988 | Bjorkholm | 378/87 |
| 5,313,511 A | 5/1994 | Annis et al. | 378/87 |

OTHER PUBLICATIONS

Materials Evaluation, *Journal for the American Society of Non–Destructive Testing*, by J. Stein et al., Jul. 1972, vol. 30.
*Elements of X–Ray Diffraction*, by B.D. Cullity, Addison–Wesley Publishing Company, Reading Massachusetts, © 1956, pp. 104–111 and 166–168.
On the Sensitivity and Application Possibilities of a Novel Compton Scatter Imaging System, *IEEE Transactions on Nuclear Science*, vol. NS–29, No. 3, Jun. 1982, by G. Harding.
Flying Spot X–Ray Imaging System, by J.A. Stein and Roderick D. Swift, *Materials Evaluation*, vol. 30, #7, p. 141 et seq.

(Continued)

*Primary Examiner*—Sharon E Payne

(57) ABSTRACT

An imaging device for increasing the ability to recognize, in x-ray produced images, materials of low atomic number. A flying spot scanner illuminates an object to be imaged in a raster pattern; the flying spot repeatedly sweeps a line in space, and the object to be imaged is moved so that the illuminating beam intersects the object. At least a pair of x-ray detectors are employed, each pair associated with signal processing apparatus and a display. The two detectors employed (and the associated electrons and display) are selected from a set of three which includes a transmitted detector located at the line in space which is repeatedly traversed by the pencil beam, a forward scatter detector which is located further from the x-ray beam than the object to respond to photons scattered by the object being illuminated out of the path of the beam, and a back scatter detector which is located closer to the x-ray source than the object being imaged and also arranged to detect photons scattered out of the beam path by the object. In another embodiment of the invention all three detectors and their associated electronics/displays are employed.

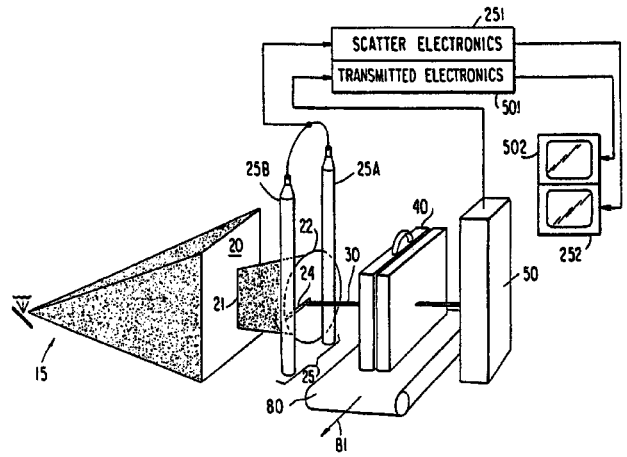

OTHER PUBLICATIONS

Complaint and Jury Demand, Sep. 13, 2007, in *AS&E, Inc. v. Autoclear, LLC et al.*, U.S. District Court for the Eastern District of Virginia, C–2:07–cv–00415–RAJ–FBS.

AS&E's Motion for Default Judgment, Permanent Injunction, and Other Relief, Nov. 9, 2007, in *AS&E, Inc. v. Autoclear, LLC et al.*, U.S. District Court for the Eastern District of Virginia, C–2:07–cv–00415–RAJ–FBS.

AS&E's Memorandum in Support of its Motion for Default Judgment, Permanent Injunction, and Other Relief, Nov. 9, 2007, in *AS&E, Inc. v. Autoclear, LLC et al.*, U.S. District Court for the Eastern District of Virginia, C–2:07–cv–00415–RAJ–FBS.

Defendants' Opposition to Plaintiff's Motion for Default Judgment, Permanent Injunction, and Other Relief; and Defendants' Motion to Set Aside Entry of Default, Nov. 19, 2007, in *AS&E, Inc. v. Autoclear, LLC et al*, U.S. District Court for the Eastern District of Virginia, C–2:07–cv–00415–RAJ–FBS.

Memorandum in Support of Defendants' Opposition to Plaintiff's Motion for Default Judgment, Permanent Injunction, and Other Relief; and Defendants' Motion to Set Aside Entry of Default, Nov. 19, 2007, in *AS&E, Inc. v. Autoclear, LLC et al.*, U.S. District Court for the Eastern District of Virginia, C–2:07–cv–00415–RAJ–FBS.

Declaration of Bradley L. Conway, Nov. 19, 2007, in *AS&E, Inc. v. Autoclear, LLC et al.*, U.S. District Court for the Eastern District of Virginia, C–2:07–cv–00415–RAJ–FBS.

AS&E's Rebuttal in Further Support of its Motion for Default Judgment, Permanent Injunction, and Other Relief, Nov. 26, 2007, in *AS&E, Inc. v. Autoclear, LLC et al.*, U.S. District Court for the Eastern District of Virginia, C–2:07–cv–00415–RAJ–FBS.

AS&E's Opposition to AutoClear's Motion to Set Aside its Default, Nov. 30, 2007, in *AS&E, Inc. v. Autoclear, LLC et al.*, U.S. District Court for the Eastern District of Virginia, C–2:07–cv–00415–RAJ–FBS.

AS&E's Motion to Strike the Declaration of Bradley L. Conway; AS&E's Memorandum in Support of its Motion to Strike the Declaration of Bradley L. Conway, Dec. 5, 2007, in *AS&E, Inc. v. Autoclear, LLC et al.*, U.S. District Court for the Eastern District of Virginia, C–2:07–cv–00415–RAJ–FBS.

Defendants' Rebuttal in Further Support of its Motion to Set Aside Entry of Default, Dec. 5, 2007, in *AS&E, Inc. v. Autoclear, LLC et al.*, U.S. District Court for the Eastern District of Virginia, C–2:07–cv–00415–RAJ–FBS.

Declaration of Bradley L. Conway, Dec. 5, 2007, in *AS&E, Inc. v. Autoclear, LLC et al.*, U.S. District Court for the Eastern District of Virginia, C–2:07–cv–00415–RAJ–FBS.

Declaration of Theodore James Pierson, Jr., Dec. 5, 2007, in *AS&E, Inc. v. Autoclear, LLC et al.*, U.S. District Court for the Eastern District of Virginia, C–2:07–cv–00415–RAJ–FBS.

Memorandum in Opposition to Plaintiff's Motion to Strike the (First) Declaration of Bradley L. Conway, Dec. 17, 2007, in *AS&E, Inc. v. Autoclear, LLC et al.*, U.S. District Court for the Eastern District of Virginia, C–2:07–cv–00415–RAJ–FBS.

AS&E's Rebuttal in Further Support of its Motion to Strike the Declaration of Bradley L. Conway, Dec. 26, 2007, in *AS&E, Inc. v. Autoclear, LLC et al.*, U.S. District Court for the Eastern District of Virginia, C–2:07–cv–00415–RAJ–FBS.

Amended Answer, Separate Defenses and Counter–Claim to Amended Complaint, and Demand for Jury Trial, May 16, 2008, in *AS&E, Inc. v. Autoclear, LLC et al.*, U.S. District Court for the Eastern District of Virginia, C–2:07–cv–00415–RAJ–FBS.

Reply to Amended Answer, Separate Defenses and Counter–Claim to Amended Complaint, and Demand for Jury Trial, Jun. 5, 2008, in *AS&E, Inc. v. Autoclear, LLC et al.*, U.S. District Court for the Eastern District of Virginia, C–2:07–cv–00415–RAJ–FBS.

Motion to Strike Inequitable Conduct Defenses and Counterclaim, Jun. 5, 2008, in *AS&E, Inc. v. Autoclear, LLC et al.*, U.S. District Court for the Eastern District of Virginia, C–2:07–cv–00415–RAJ–FBS.

Memorandum in Support of Motion to Strike Inequitable Conduct Defenses and Counterclaim, Jun. 5, 2008, in *AS&E, Inc. v. Autoclear, LLC et al.*, U.S. District Court for the Eastern District of Virginia, C–2:07–cv–00415–RAJ–FBS.

Memorandum in Opposition to Plaintiff's Motion to Strike Inequitable Conduct Defenses and Counterclaims; and in Support of Defendants' Motion for Leave to Amend/Supplement Answer, Jun. 18, 2008, in *AS&E, Inc. v. Autoclear, LLC et al.*, U.S. District Court for the Eastern District of Virginia, C–2:07–cv–00415–RAJ–FBS.

Motion for Leave to Amend/Supplement Answer, Jun. 18, 2008, in *AS&E, Inc. v. Autoclear, LLC et al.*, U.S. District Court for the Eastern District of Virginia, C–2:07–cv–00415–RAJ–FBS.

Expert Report of Thomas G. Matheson Regarding United States Patent Nos. 5,313,511 and 6,546,072, Sep. 18, 2008, in *AS&E, Inc. v. Autoclear, LLC et al.*, U.S. District Court for the Eastern District of Virginia, C–2:07–cv–00415–RAJ–FBS.

Rebuttal Expert Report of Robert G.A. Zamenhof, Ph.D., F.A.A.P.M., Oct. 13, 2008, in *AS&E, Inc. v. Autoclear, LLC et al.*, U.S. District Court for the Eastern District of Virginia, C–2:07–cv–00415–RAJ–FBS.

Memorandum Order, Dec. 6, 2009, in *AS&E, Inc. v. Autoclear, LLC et al.*, U.S. District Court for the Eastern District of Virginia, C–2:07–cv–00415–RAJ–FBS.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

\* \* \* \* \*